Patented Apr. 21, 1953

2,635,985

UNITED STATES PATENT OFFICE 2,635,985

EXTRACTION OF VITAMIN B₁₂-ACTIVE COMPOUNDS FROM AQUEOUS SOLUTIONS USING SOLID TRICHLOROPHENOL

Robert G. Denkewalter, Westfield, George B. Hughey, Metuchen, and Stephen Kutosh, Kenilworth, N. J., assignors to Merck & Co., Inc., Rahway, N. J., a corporation of New Jersey No Drawing. Application August 23, 1950, Serial No. 181,106

4 Claims. (Cl. 167—81)

This invention is concerned generally with the recovery of anti-pernicious anemia factors from aqueous solutions. More particularly, it relates to a novel process for separating vitamin $B_{12}$ and vitamin $B_{12}$-like compounds from aqueous solutions, including fermentation broths, containing the same, by extracting the vitamin $B_{12}$ and/or vitamin $B_{12}$-like compounds from said aqueous solutions utilizing solid 2,4,5-trichlorophenol as the extracting agent.

Vitamin $B_{12}$ is a new chemical compound fully characterized in a co-pending application of applicants' assignee, Serial No. 146,404, filed February 25, 1950, and in U. S. Patent No. 2,563,794, which is capable of promoting the growth of the microorganism *Lactobacillus lactis* Dorner, and which possesses marked and effective action in the therapeutic treatment of Addisonian pernicious anemia and other macrocytic anemias. Vitamin $B_{12}$ is ordinarily prepared by fermenting an aqueous nutrient medium by means of a vitamin $B_{12}$-producing strain of Streptomyces and subjecting the fermentation broth thus obtained to a purification operation.

By vitamin $B_{12}$-like compounds are meant the red crystalline compounds (not vitamin $B_{12}$) which are obtained when a fermentation broth containing them is subjected to the purification treatment utilized in the purification of vitamin $B_{12}$ (as described on pages 13 to 16 of said application Serial No. 146,404) but omitting the counter-current distribution procedure employed as the final step in this purification operation. These vitamin $B_{12}$-like compounds can be characterized by the fact that they are readily convertible to pure vitamin $B_{12}$ per se by treatment with cyanide ion, as described in a co-pending application of applicants' assignee, Serial No. 120,009, filed October 6, 1949, now Patent No. 2,530,416 issued November 21, 1950. Vitamin $B_{12}$ and vitamin $B_{12}$-like compounds can be referred to by the expression, vitamin $B_{12}$-active compounds.

The recovery of a vitamin $B_{12}$-active compound, that is vitamin $B_{12}$ and/or a vitamin $B_{12}$-like compound from Streptomyces fermentation broths has heretofore been accomplished by treating said broths with an adsorbent material such as activated charcoal or fuller's earth which produces an adsorbate containing vitamin $B_{12}$ and/or vitamin $B_{12}$-like compounds present in the broth together with various contaminants. Antibiotics, such as streptomycin or grisein, which may be present in said broth are adsorbed along with the vitamin $B_{12}$ and/or vitamin $B_{12}$-like compounds. The adsorbate is then eluted with a suitable solvent, such as an aqueous solution of pyridine or an alkyl substituted pyridine, and the eluate evaporated thereby producing an elaboration product which contains the vitamins $B_{12}$ and/or vitamin $B_{12}$-like compounds, together with some of the contaminants, such as grisein or streptomycin, which may have been present in the original broth. The elaboration product thus obtained is extracted with an elaboration solvent, such as water or a lower aliphatic water-miscible alcohol, and the resulting extract is subjected to chromatographic fractionation by adding said extract to a column of adsorbent material and washing the column with solvent, fractionally to elute the vitamin $B_{12}$ and/or vitamin $B_{12}$ compounds from the adsorbent material.

The resulting eluate can then be further processed as set forth in the aforementioned application Serial No. 146,404 and in U. S. Patent No. 2,563,794, to produce pure vitamin $B_{12}$, or to produce the vitamin $B_{12}$-like substances substantially free of contaminating materials.

Thus, the preparation of a vitamin enriched extract suitable for chromatography, starting with a fermentation broth containing vitamin $B_{12}$ and/or vitamin $B_{12}$-like compounds, previously involved the following purification operations: (1) adsorption of the vitamin $B_{12}$ and/or vitamin $B_{12}$-like substances from fermentation broths utilizing activated carbon or fuller's earth as the adsorbing agent; (2) elution of the adsorbate with pyridine; (3) evaporation of the pyridine eluate; and (4) extraction of the elaboration product with another solvent.

It is now discovered that the preparation of a vitamin enriched extract suitable for chromatography can be accomplished in a single adsorption and elution operation starting with a fermentation broth containing vitamin $B_{12}$ and/or vitamin $B_{12}$-like compounds. This is accomplished by utilizing, instead of the adsorbents heretofore employed for this purpose, a solid extracting agent possessing superior selective properties. This superior extractant is solid 2,4,5-trichlorophenol. When an aqueous solution containing vitamin $B_{12}$ or vitamin $B_{12}$-like compounds is mixed with or passed through a column of solid 2,4,5-trichlorophenol, the vitamin $B_{12}$ and/or vitamin $B_{12}$-like substances are substantially quantitatively extracted from the aqueous solution. Moreover, when a fermentation broth containing vitamin $B_{12}$ and/or vitamin $B_{12}$-like compounds is contacted with solid 2,4,5-trichlorophenol, it has been found that the trichlorophenol selectively extracts vitamin $B_{12}$ and/or vitamin $B_{12}$-like compounds, while, at the same time, leaving behind in the residual broth contaminants which are ordinarily adsorbed utilizing conventional adsorbing agents such as activated carbon or fuller's earth.

It is a further feature of this invention that the solid 2,4,5-trichlorophenol extract (i. e. containing extracted vitamin $B_{12}$ and/or vitamin $B_{12}$-like compounds) can be dissolved in a suitable solvent to form a solution of the vitamin materials. The vitamin $B_{12}$ and vitamin $B_{12}$-like substances are readily extracted from this solution by means of water, using either a batch extractor or an extraction column, whereby substantially quantitative transfer of vitamin $B_{12}$ and vitamin $B_{12}$-like substances to the water phase is secured. This aqueous extraction step is accompanied by a further separation and purification of vitamins since some of the contaminating materials are retained in the non-aqueous layer. This procedure thus combines the advantages of utilizing a solid extracting material together with the advantages of a liquid-liquid extraction operation for the recovery of the extracted components.

The fact that 2,4,5-trichlorophenol can be employed in solid form is very unusual since other phenolic compounds cannot be used for this purpose. For example, various phenolic compounds such as p-octylphenol, pentachlorophenol, o-phenyl-phenol, and the like, as well as 2,4,5-trichlorophenol itself, when employed in liquid form (i. e. at a temperature above the melting point where the phenolic compound is a solid at room temperature), will extract vitamin $B_{12}$ and/or vitamin $B_{12}$-like compounds from aqueous solutions. No other phenolic compound (such as, for example the p-octylphenol, the pentachlorophenol, or the p-phenyl phenol enumerated above) has been found to effect measurable extraction of vitamin $B_{12}$ and/or vitamin $B_{12}$-like substances from aqueous solutions when the phenolic compounds are utilized in the solid form. It is indeed surprising, therefore, that, when 2,4,5-trichlorophenol is employed as a solid, it accomplishes this extraction in a rapid and quantitative manner to form a solid solution of vitamin $B_{12}$ and/or vitamin $B_{12}$-like compounds in the phenolic extractant.

It is a special feature of this invention that 2,4,5-trichlorophenol can be readily prepared in the form of small hard pellets, particularly advantageous for column operation. Other related phenols are frequently soft and oily and obtainable as a solid only in larger and irregular shapes.

The advantages of utilizing solid 2,4,5-trichlorophenol as an extraction agent, of course, obviates the emulsion difficulties frequently encountered in liquid-liquid extraction procedures and there is no separation problem. A further feature of this extraction utilizing the extracting agent in solid form is that the quantity of solid phenolic extractant is very much less than that required in a liquid-liquid extraction operation, and that the loss of extractant is very much reduced as contrasted with the losses involved when a liquid extractant is utilized. This is particularly true in column operation, where, for example, it is possible, utilizing solid 2,4,5-trichlorophenol, to effect a complete extraction of vitamin $B_{12}$ and/or vitamin $B_{12}$-like substances from an aqueous solution utilizing one part of phenolic compound to 500 parts of solution, whereas the solvent requirement for a liquid-liquid extraction is approximately 1 part of extractant to 5 parts of the solution.

In carrying out the present invention, an aqueous solution containing vitamin $B_{12}$ and/or vitamin $B_{12}$-like substances is mixed with or passed through a column of solid 2,4,5-trichlorophenol, whereby the vitamin $B_{12}$ and/or vitamin $B_{12}$-like substances are extracted by the phenolic compound.

The 2,4,5-trichlorophenol extract is then contacted with water and an organic solvent immiscible with water, (in which 2,4,5-trichlorophenol is soluble and in which vitamin $B_{12}$ and/or vitamin $B_{12}$-like compounds are substantially insoluble), such as a chlorinated hydrocarbon, for example carbon tetrachloride, chloroform, ethylene dichloride and the like. Alternatively, the solid 2,4,5-trichlorophenol can first be dissolved in an organic solvent miscible with water (forming a solution in which both 2,4,5-trichlorophenol and vitamin $B_{12}$ and/or vitamin $B_{12}$-like compounds are soluble) such as acetone, methanol and other lower aliphatic alcohols. Water, and an organic solvent of the type first mentioned, can then be added to the organic solvent solution containing the 2,4,5-trichlorophenol and the vitamin $B_{12}$ and/or vitamin $B_{12}$-like compounds. The water layer which results from either of the foregoing procedures contains substantially all of the vitamin $B_{12}$ and/or vitamin $B_{12}$-like compounds; this water layer is separated and can be further processed as described in the co-pending application of applicants' assignee mentioned hereinabove, namely Serial No. 146,404, and in U. S. Patent No. 2,563,794, to produce pure vitamin $B_{12}$.

The following example illustrates a method of carrying out the present invention, but it is to be understood that this example is given for purposes of illustration and not of limitation.

*Example*

A fermentation broth, obtained by fermenting an aqueous nutrient medium with a strain of *Streptomyces griseus* which produces both grisein and vitamin $B_{12}$ substantially as described in the co-pending application of applicants' assignee, Serial No. 146,404, was clarified by filtration and adjusted to a pH of 4.0 by the addition of hydrochloric acid. This broth was passed through a column packed with solid spheres of 2,4,5-trichlorophenol, which column was prepared as follows: 6000 gms. of 2,4,5-trichlorophenol was melted and formed into small solid spheres by pouring into agitated cold water. These spheres of solid trichlorophenol were placed in a glass column 3 inches in diameter and 15 feet in height, equipped with feed and drain connections. The broth was passed through the column in upward flow at a rate of 700–800 ml. per minute until the entire 225 gallons had passed through. The effluent was discarded. The column was then washed with water to remove residual broth.

The trichlorophenol adsorbate was next dissolved by adding 3 liters of acetone. To the resulting solution was added 3 liters of water and 36 liters of carbon tetrachloride. The aqueous layer was separated, the organic layer was extracted with 3 liters of water, and the water layers were combined. Carbon tetrachloride was removed from the organic layer by distillation, and the residual 2,4,5-trichlorophenol was saved for re-use.

The combined water layers were saturated with ammonium sulfate and then extracted twice with 300 ml. of benzyl alcohol. The combined benzyl alcohol extracts were chromatographed, precipitated, and further treated substantially as described in the co-pending application of applicants' assignee Serial No. 146,404, filed February 25, 1950, and in U. S. Patent No. 2,563,794, thereby producing pure vitamin $B_{12}$.

Various changes and modifications may be made in carrying out the present invention without departing from the spirit and scope thereof. Insofar as these changes and modifications are within the purview of the annexed claims, they are to be considered as part of our invention.

We claim:

1. In a process for recovering an anti-pernicious anemia factor, consisting of a vitamin $B_{12}$-active compound, from an aqueous solution containing said factor, the step which comprises contacting said solution with solid 2,4,5-trichlorophenol thereby extracting said factor from said aqueous solution.

2. In a process for recovering an antipernicious anemia factor, consisting of a vitamin $B_{12}$-active compound, from a fermentation broth containing said factor, the steps which comprise contacting said broth with solid 2,4,5-trichlorophenol thereby extracting said factor from said broth, and bringing the trichlorophenol extract thus obtained into intimate contact with water and a water-immiscible organic liquid comprising a chlorinated hydrocarbon solvent, thereby forming a two-phase mixture consisting of a non-aqueous layer containing the trichlorophenol and a water layer containing the anti-pernicious anemia factor.

3. In a process for recovering vitamin $B_{12}$ from a fermentation broth containing that vitamin, the steps which comprise contacting said broth with solid 2,4,5-trichlorophenol thereby extracting said vitamin $B_{12}$ from said broth, and bringing the trichlorophenol extract into intimate contact with water and a water-immiscible organic liquid comprising carbon tetrachloride, thereby forming a two-phase mixture consisting of a non-aqueous layer containing the trichlorophenol and a water layer containing the vitamin $B_{12}$.

4. In a process for recovering vitamin $B_{12}$ from a fermentation broth containing that vitamin, the steps which comprise contacting said broth with solid 2,4,5-trichlorophenol thereby extracting the vitamin $B_{12}$ from said fermentation broth, dissolving the resulting trichlorophenol-vitamin $B_{12}$ extract in acetone, and contacting the acetone solution thus obtained with water and carbon tetrachloride, thereby forming a two-phase mixture consisting of a carbon tetrachloride layer containing the 2,4,5-trichlorophenol and an aqueous layer containing the vitamin $B_{12}$.

ROBERT G. DENKEWALTER.
GEORGE B. HUGHEY.
STEPHEN KUTOSH.

References Cited in the file of this patent

UNITED STATES PATENTS

| Number | Name | Date |
|---|---|---|
| 2,134,256 | Laland | Oct. 25, 1938 |
| 2,530,416 | Wolf | Nov. 21, 1950 |

FOREIGN PATENTS

| Number | Country | Date |
|---|---|---|
| 349,794 | Germany | Mar. 9, 1922 |

OTHER REFERENCES

Smith: Proceedings of the Biochemical Society in Biochemical Journal, volume 43 (Number 1), October 1948, pages VIII, IX.

Fantes: Proceedings of the Royal Society (1950), pages 592 to 596.